US012094078B2

(12) United States Patent
Kansara

(10) Patent No.: US 12,094,078 B2
(45) Date of Patent: Sep. 17, 2024

(54) SYSTEMS AND METHODS FOR SPLINE-BASED OBJECT TRACKING

(71) Applicant: Netflix, Inc., Los Gatos, CA (US)

(72) Inventor: Apurvakumar Dilipkumar Kansara, San Jose, CA (US)

(73) Assignee: Netlix, Inc., Los Gatos, CA (US)

( * ) Notice: Subject to any disclaimer, the term of this patent is extended or adjusted under 35 U.S.C. 154(b) by 351 days.

(21) Appl. No.: 17/665,357

(22) Filed: Feb. 4, 2022

(65) Prior Publication Data
US 2023/0064431 A1    Mar. 2, 2023

Related U.S. Application Data

(60) Provisional application No. 63/239,336, filed on Aug. 31, 2021.

(51) Int. Cl.
*G06T 3/4007* (2024.01)
*G06T 7/246* (2017.01)
*G06T 11/60* (2006.01)

(52) U.S. Cl.
CPC ............ *G06T 3/4007* (2013.01); *G06T 7/248* (2017.01); *G06T 11/60* (2013.01); *G06T 2207/10016* (2013.01)

(58) Field of Classification Search
CPC ....... G06T 3/4007; G06T 7/248; G06T 11/60; G06T 2207/10016; G06V 10/762; G06V 40/10; G06V 20/40
See application file for complete search history.

(56) References Cited

U.S. PATENT DOCUMENTS

| | | | | |
|---|---|---|---|---|
| 6,417,853 B1 * | 7/2002 | Squires | ................... | G06T 7/246 345/473 |
| 2004/0207665 A1 * | 10/2004 | Mathur | ................... | G06T 11/60 715/853 |
| 2014/0210944 A1 * | 7/2014 | Jeong | ................... | H04N 13/264 348/43 |
| 2015/0139494 A1 * | 5/2015 | Ishikawa | ................ | G06V 20/40 382/103 |

(Continued)

FOREIGN PATENT DOCUMENTS

DE    102020125197 A1 *  5/2021  ............. G06F 17/18

OTHER PUBLICATIONS

International Search Report and Written Opinion mailed Dec. 16, 2022 in related PCT Application No. PCT/US2022/042101.

(Continued)

*Primary Examiner* — Pinalben Patel
(74) *Attorney, Agent, or Firm* — Greenberg Traurig, LLP

(57) ABSTRACT

The disclosed computer-implemented method may include (1) accessing a video portraying an object within a set of frames, (2) defining a subset of key frames within the video based on movement of the object across the set of frames, (3) generating, for each key frame within the subset of key frames, a spline outlining the object within the key frame, (4) receiving input to adjust, for a selected key frame within the subset of key frames, a corresponding spline, and (5) interpolating the adjusted spline with a spline in a sequentially proximate key frame to define the object in frames between the selected key frame and the sequentially proximate key frame. Various other methods, systems, and computer-readable media are also disclosed.

18 Claims, 13 Drawing Sheets

(56) References Cited

U.S. PATENT DOCUMENTS

2020/0074185 A1* 3/2020 Rhodes .................. G06N 3/047

OTHER PUBLICATIONS

Weng et al., "Keyframe-Based Video Object Deformation," International Conference on Cyberworlds, IEEE, Sep. 22, 2008, pp. 142-149.
Li et al., "Roto++: Accelerating Professional Rotoscoping using Shape Manifolds," ACM Transactions on Graphics, Jul. 11, 2016, vol. 35, No. 4, pp. 1-17.
Du et al., "Variational Video Mask Generation," International Conference on Multimedia Information Networking and Security, IEEE, Nov. 18, 2009, pp. 41-45.

* cited by examiner

SYSTEMS AND METHODS FOR SPLINE-BASED OBJECT TRACKING

CROSS REFERENCE TO RELATED APPLICATION

This application claims the benefit of U.S. Provisional Application No. 63/239,336, filed 31 Aug. 2021, the disclosure of which is incorporated, in its entirety, by this reference.

BACKGROUND

Tracking and isolating objects in a video may have various valuable applications. For example, a video editing system may remove an object from a video (e.g., frame-by-frame, over time), apply a visual effect to an object in isolation, etc. However, the task of tracking and isolating objects may be time consuming for a video effects artist. In some examples, a tool may aid in creating a pixel mask for an object in each frame of a video. However, the pixel maps may be imperfect, and fixing the pixel mask pixel-by-pixel may be a laborious process.

SUMMARY

As will be described in greater detail below, the present disclosure describes systems and computer-implemented methods for spline-based object tracking. One of these computer-implemented methods may include accessing a video portraying an object within a set of frames and defining a subset of key frames within the video based on movement of the object across the set of frames. The method may also include generating, for each key frame within the subset of key frames, a spline outlining the object within the key frame. The method may further include receiving input to adjust, for a selected key frame within the subset of key frames, a corresponding spline. In addition, the method may include interpolating the adjusted spline with a spline in a sequentially proximate key frame to define the object in frames between the selected key frame and the sequentially proximate key frame.

In one example, defining the subset of key frames may include (1) calculating, for each sequential pair of frames within the set of frames, a movement metric describing movement of the object between the sequential pair of frames, (2) determining, for each sequential pair of frames within the set of frames, whether the movement metric exceeds a predetermined threshold, and (3) including, for each sequential pair of frames where the movement metric exceeds the predetermined threshold, a frame from the sequential pair of frames in the subset of key frames.

In the above example or other examples, calculating, for each sequential pair of frames, the movement metric may include (1) matching a set of local features between the object in a first image of the sequential pair of frames and in the object in a second image of the sequential pair of frames, and (2) for each local feature within the set of local features, calculating a difference of position between the local feature in the first image and the local feature in the second image. In this or other examples, the method may also include (1) decomposing the object into a set of parts, (2) defining a part-based subset of key frames within the video based on movement of a part from the set of parts across the set of frames, (3) generating, for each part-based key frame within the subset of part-based key frames, a spline of the part within the part-based key frame, (4) receiving input to adjust, for a selected part-based key frame within the subset of part-based key frames, a corresponding part-based spline, and (5) interpolating the adjusted part-based spline with a part-based spline in a sequentially proximate part-based key frame to define the part in frames between the selected part-based key frame and the sequentially proximate part-based key frame.

Furthermore, in the above or other examples, decomposing the object into the set of parts may include clustering local features from within the set of local features based on movement of the local features. Additionally or alternatively, the method may include recomposing the object from the set of parts based at least in part on the adjusted part-based spline of the part.

In some examples, generating, for each key frame within the subset of key frames, the spline outlining the object within the key frame may include (1) identifying, for each key frame within the subset of key frames, a pixel mask of the object and (2) generating the spline to outline the pixel mask. In these or other examples, identifying, for each key frame within the subset of key frames, the pixel mask of the object may include (1) identifying the object in an initial frame of the set of frames and (2) tracking the object from the initial frame through the set of frames. In addition, in some examples, identifying the object in the initial frame may include receiving user input indicating one or more points within the initial frame included within the object.

In various examples, the method may include modifying the object within the video based at least in part on the adjusted spline of the object.

In addition, a corresponding system for spline-based object tracking may include at least one physical processor and physical memory including computer-executable instructions that, when executed by the physical processor, cause the physical processor to perform operations including (1) accessing a video portraying an object within a set of frames, (2) defining a subset of key frames within the video based on movement of the object across the set of frames, (3) generating, for each key frame within the subset of key frames, a spline outlining the object within the key frame, (4) receiving input to adjust, for a selected key frame within the subset of key frames, a corresponding spline, and (5) interpolating the adjusted spline with a spline in a sequentially proximate key frame to define the object in frames between the selected key frame and the sequentially proximate key frame.

In some examples, the above-described method may be encoded as computer-readable instructions on a computer-readable medium. For example, a computer-readable medium may include one or more computer-executable instructions that, when executed by at least one processor of a computing device, may cause the computing device to perform operations including (1) accessing a video portraying an object within a set of frames, (2) defining a subset of key frames within the video based on movement of the object across the set of frames, (3) generating, for each key frame within the subset of key frames, a spline outlining the object within the key frame, (4) receiving input to adjust, for a selected key frame within the subset of key frames, a corresponding spline, and (5) interpolating the adjusted spline with a spline in a sequentially proximate key frame to define the object in frames between the selected key frame and the sequentially proximate key frame.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
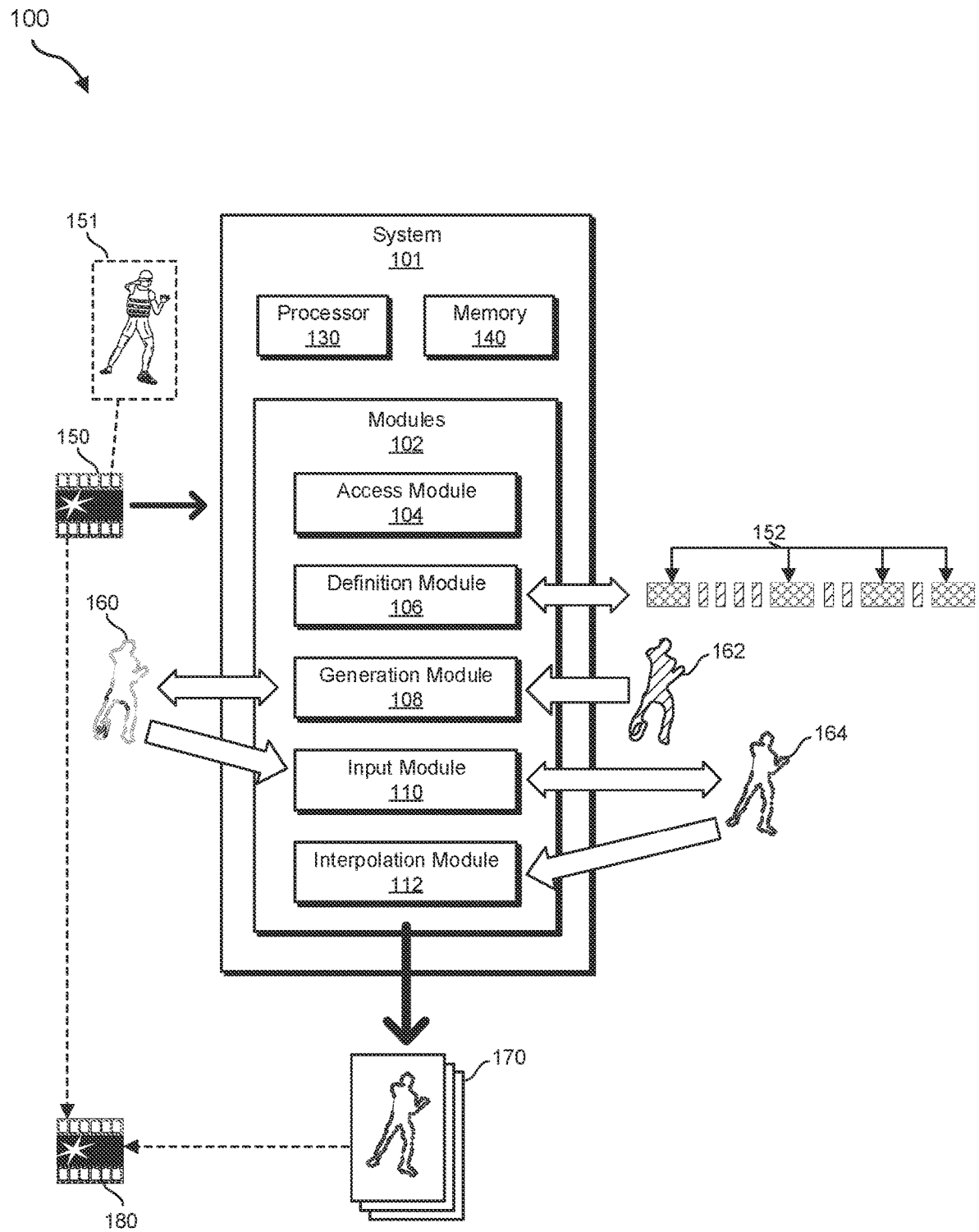
FIG. 1 is a flow diagram of an exemplary system for spline-based object tracking.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Tracking and isolating objects in a video may have various valuable applications. For example, a video editing system may remove an object from a video (e.g., frame-by-frame, over time), apply a visual effect to an object in isolation, etc. However, the task of tracking and isolating objects may be time consuming for a video effects artist. In some examples, a tool may automatically create a pixel mask for an object in each frame of a video. However, the pixels masks may be imperfect, and fixing the pixel mask pixel-by-pixel may be a laborious process.

Accordingly, systems described herein may use a spline to outline a tracked object (and thereby define a mask for the object). As used herein, the term "spline" may refer to any curve that may outline a visual element. Adjusting the spline (e.g., by adjusting one or more points of the spline) may be significantly more efficient than adjusting a pixel mask. Moreover, the spline may be imported into or exported from any number of video editing tools. In addition, systems described herein may automatically identify keyframes for a tracked object by, e.g., determining for which frames there is a significant change to the position of the tracked object or the camera.

In accordance with the systems and methods described herein, a visual effects artist may be able to effectively isolate and/or fix a previous attempt at isolating an object by adjusting a spline outlining the object at identified keyframes. Systems described herein may then interpolate the mask of the tracked object between keyframes.

Furthermore, in some examples, systems described herein may separate the tracked object into clusters of subparts that move together over time. In some embodiments, these systems may track each cluster according to its own set of keyframes, and a visual effects artist may focus work on an important or complex cluster. Systems described herein may define movement of the tracked object for purposes of clustering subparts in terms of the two-dimensional image of the object in the video, using, e.g., skeletal tracking inferred from the two-dimensional image and/or depth information inferred from the two-dimensional image.

Systems described herein may improve the functioning of a computer by improving the object-tracking capabilities of the computer by tracking an object based on a user-editable spline. Additionally or alternatively, these systems may improve the functioning of a computer by improving the video editing capabilities of the computer by enabling the accurate and efficient adjustment of the definition of an object across multiple video frames with user-friendly edits to a key frame. The systems and methods described herein may represent an improvement to the field of object tracking in videos by improving the accuracy of object tracking and of video editing. The various embodiments mentioned above and additional embodiments will be described in greater detail below with regard to computing environment 100 of FIG. 1, computer-implemented method 200 of FIG. 2, and the embodiments depicted in FIGS. 3-13.

FIG. 1 illustrates a computing environment 100 that includes a computer system 101. The computer system 101 includes software modules, embedded hardware components such as processors, or a combination of hardware and software. The computer system 101 is substantially any type of computing system including a local computing system or a distributed (e.g., cloud) computing system. In some cases, the computer system 101 includes at least one processor 130 and at least some system memory 140. The computer system 101 includes program modules 102 for performing a variety of different functions. The program modules are hardware-based, software-based, or include a combination of hardware and software. Each program module uses computing hardware and/or software to perform specified functions, including those described herein below.

System 101 may include an access module 104 that is configured to access a video portraying an object (e.g., a person, such as an object 151) within a set of frames. The video may be stored in any suitable form, including as one or more files within a file system, one or more database objects within a database, etc. By way of example, access module 104 may access video 150. For example, video 150 may be a resource for a production project to be edited and/or used by one or more visual effects artists. As will be discussed in greater detail, the object may represent an object of interest to be edited, modified, removed, transposed, and/or isolated for applying (and/or be excluded from the application of) one or more special effects.

System 101 may also include a definition module 106 that is configured to define a subset of key frames within the video based on movement of the object across the set of frames. Thus, for example, the key frames may represent frames demonstrating significant movement of the object. By way of example, definition module 106 may define one or more frames of video 150 as key frames 152. Thus, for example, definition module 106 may select as key frames those frames in which object 151 demonstrates significant movement (e.g., relative to a preceding and/or subsequent key frame).

System 101 may further include a generation module 108 that is configured to generate, for each key frame within the subset of key frames, a spline outlining the object within the key frame. Thus, the spline of the object for each key frame may define the bounds of the object within that frame. The spline may therefore be useful for isolating the object from the rest of the frame (e.g., to apply an effect within or outside the bounds of the spline). By way of example, generation module 108 may generate a spline 160 outlining object 151 in one of key frames 152. In one example, generation module 108 may generate spline 160 based on a pixel map 162 of object 151 that specifies which pixels object 151 occupies in the key frame.

System 101 may additionally include an input module 110 configured to receive input to adjust, for a selected key frame within the subset of key frames, a corresponding spline. The input may include user input (e.g., a visual effects artist moving a knot or a control point of the spline). By way of example, pixel map 162 may include inaccuracies (i.e., including pixels that are not a part of object 151 and/or excluding pixels that are a part of object 151). Accordingly, spline 160, when based on pixel map 162, may reflect the inaccuracies of pixel map 162. Thus, input module 110 may receiving input (e.g., from a visual effects artist) to adjust spline 160, resulting in an adjusted spline 164 that more accurately outlines object 151.

System 101 may also include an interpolation module 112 configured to interpolate the adjusted spline with a spline in a sequentially proximate key frame to define the object in frames between the selected key frame and the sequentially proximate key frame. By way of example, once input module 110 produces adjusted spline 164, adjusted spline 164 and the spline for the object from another key frame (e.g., the previous key frame or the subsequent key frame) may be interpolated across the frames of video 150 that fall between the two key frames, producing splines 170. Thus, the systems described herein may produce splines that are close approximations of the object without requiring individual input for each of the frames; adjustments to the splines of the key frames may suffice to quickly and accurately define the object across all frames of the video.

In some examples, systems described herein may provide splines 170 to perform and/or facilitate an editing operation to video 150 to produce an altered video 180. For example, a video editing application may use splines 170 to define object 151 within video 150, and may apply one or more effects to object 151 within video 150 as defined by splines 170. The above embodiments are described in greater detail below with respect to computer-implemented method 200 of FIG. 2.

Figure 2:
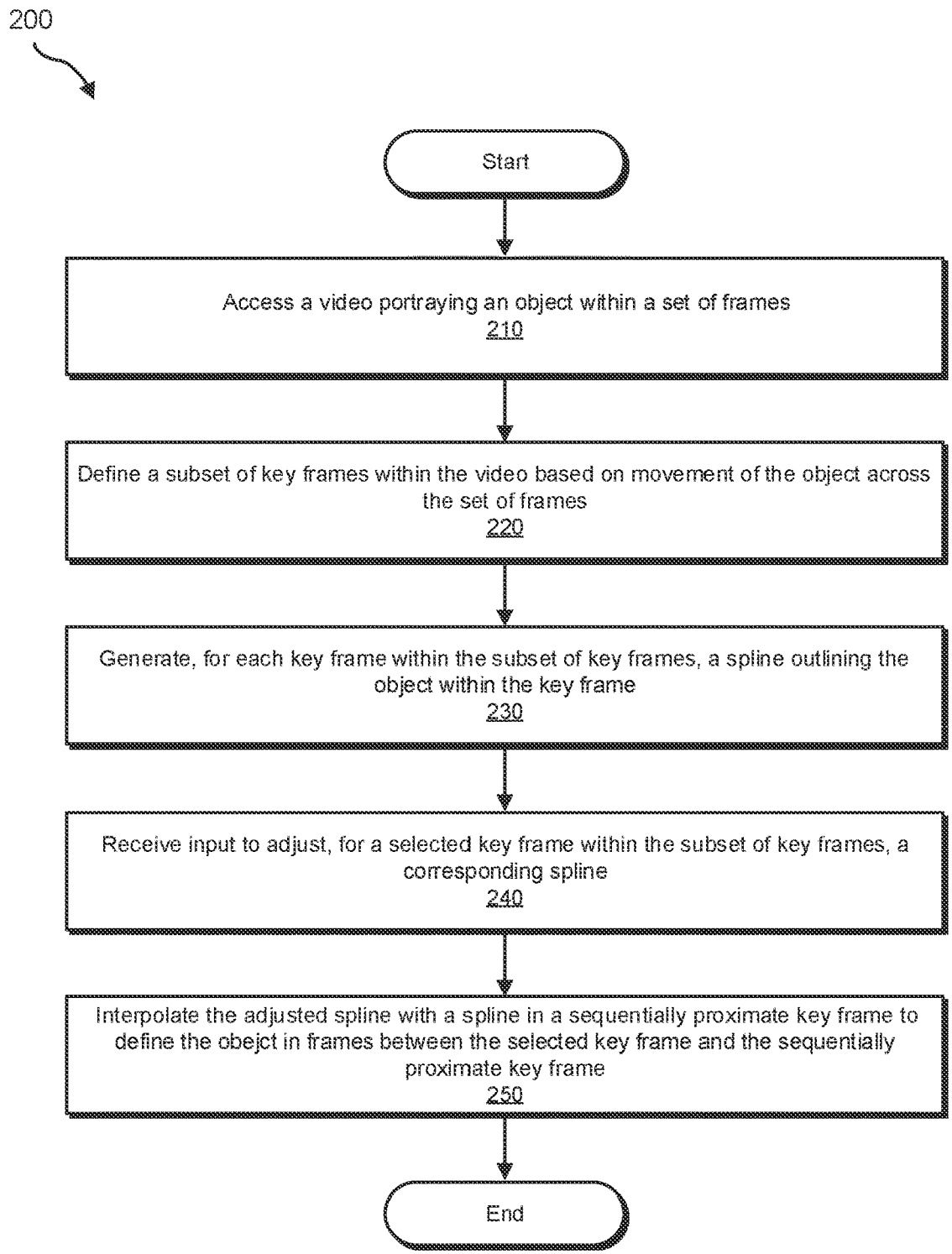
FIG. 2 is a flow diagram of an exemplary method for spline-based object tracking.

FIG. 2 is a flow diagram of an exemplary computer-implemented method for automated workflows from media asset differentials. The steps shown in FIG. 2 are performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, method 200 may include accessing a video portraying an object within a set of frames. As used herein, the term "video" may refer to any type of data object that includes a temporally ordered series of images (or "frames"). Examples of data objects include, without limitation, any type or form of data that may be digitally stored, accessed, and/or transformed. For example, a data object may include a file, a set of files, a database entry, a set of database entries, and/or a collection of data stored across any of a number of locations according to a defined format or schema.

As used herein, the term "object," as it relates to content portrayed in a video, may refer to any visible element that persists across multiple frames of the video. Thus, examples of objects may include, without limitation, a physical object or phenomenon (e.g., a person, a rock, a tree, a cloud, a flag, a shadow or reflection of another object, etc.) or a virtual object (e.g., a visual overlay). In general, the term "object" in the context outlined above may refer to any visual element that is, in principle, capable of being outlined and/or that may be subject to tracking and/or alteration across multiple frames of a video (e.g., as part of a video production project).

Systems described herein may access the video in any suitable context. For example, the video may be selected by a user (e.g., a visual effects artist) in the course of a video production process. In some examples, the user may have previously selected and/or loaded the video (e.g., into a video editing application), and the systems described herein may access the video in response to the user initiating an object tracking routine. In some examples, one or more automated processes may have previously selected the video and/or identified the object within the video and may present the video to the user (e.g., as part of a video production process).

In some examples, the "video" may be understood to refer to a continuous set of frames that each portray the object. It may be appreciated that, in a video sequence, an object may appear, then disappear (partially or completely) from view, and later reappear (e.g., due to a change in camera perspective, to the movement of the object, and/or to other visual elements that may temporarily obscure the object). Thus, in some examples, various of the systems, methods, and steps described herein may be understood to apply separately to the object during its earlier and to the object during the later appearance. Additionally or alternatively, the "video" may be understood to refer to the set of frames that spans a disappearance and reappearance of the object. In these examples, the object, as visually tracked by the systems and methods described herein, may be understood to refer to the visual portions of the object for any given frame.

Method 200, at step 220, next includes defining a subset of key frames within the video based on movement of the object across the set of frames. As will be explained in greater detail below, systems described herein may, in certain respects, treat those frames defined as key frames differently than other frames. In general, the term "key frame," as used herein, may refer to any frame designated for separate treatment by the systems and methods described herein. In some examples, the term "key frame" may refer to frames for which splines of an object are independently generated and/or edited, while splines for the object in non-key frames may typically be generated and/or edited based on the splines of the surrounding key frames. Thus, it may be appreciated that the definition of key frames may, in many examples, imply the existence of non-key frames, and that the different treatment of key frames and non-key frames by the systems and methods described herein may improve the efficiency and/or accuracy of object tracking and/or editing in videos.

The systems described herein may define the subset of key frames in any suitable context. In various examples, the systems herein may define the subset of key frames relative to the object to track, isolate, and/or edit within the video. Thus, in some examples, the systems described herein may define the subset of key frames in response to a request to track, isolate, define, outline and/or edit the object.

In some examples, a user (e.g., a visual effects artist) may use a tool to initially define and/or track the object within the video. For example, the user may select one or more pixels of the object within a frame of the video (e.g., by clicking on the object within the frame, by scribbing on the object within the frame, etc.). Systems described herein (and/or an external system) may then identify and define the object within the frame of the video using a pixel map (e.g., that indicates which pixels of the frame correspond to the object). In addition, these systems may then identify the same object in previous and subsequent frames of the video (e.g., again using a pixel map). For example, machine learning models may identify an object within a frame based on selecting a subset of the object's pixels within the frame (e.g., by scribbling on the object). Additionally or alternatively, machine learning models may identify an object within previous and/or subsequent frames. In other examples, systems described herein may use any of a variety of computer vision techniques to automatically identify objects within a video (e.g., by naming the object).

As discussed above, one or more systems may identify and define an object in various frames of a video using a pixel mask for each frame. Regardless of how the pixel masks are originally produced, systems described herein may make initial use of pixel masks to identify and define the object. Having initially identified the object within the video, systems described herein may determine the key frames in any suitable manner. For example, the systems described herein may determine the key frames based on the amount of movement the object shows between frames. Thus, for example, systems described herein may measure movement of the object between frames, and, based on determining that the movement is significant (e.g., exceeds a predetermined threshold), may designate the frame responsible for the significant movement as a key frame. In some examples, systems described herein may select key frames based on movement between consecutive frames. Additionally or alternatively, these systems may select key frames based on cumulative movement across a series of frames exceeding a predetermined threshold.

Systems described herein may measure the movement of an object between frames in any suitable manner. For example, these systems may perform feature tracking of points (e.g., pixels) within the object. In one example, a trained neural network may assign points of the object in one frame to points of the object in another frame. The systems described herein may then calculate an overall movement of the object based on an aggregation of the movement of the each of the points from one frame to the next. The movement of the points may be aggregated into a single movement metric using any suitable aggregation function, including, e.g., a sum of the movement of the points, an average movement of the points, etc.

As described above, the systems described herein may select a set of key frames for the object. Additionally or alternatively, the systems described herein may select different sets of key frames for different parts of the object. For example, systems described herein may decompose the object into multiple parts, separately track the parts of the object, and separately measure movement of the parts between frames. In one example, the systems described herein may group portions of the object that move together into distinct parts. In one embodiment, using the earlier example of feature tracking of points of the object, the systems described herein may perform unsupervised clustering on the points of the object to determine which portions of the object move together and thereby define parts of the object. Upon measuring movement of distinct parts of the object, systems described herein may determine a set of key frames for each part based on the measured movement using any of the approaches described earlier for determining a set of key frames for the entire object based on the movement of the object.

Method 200, at step 230, next includes generating, for each key frame within the subset of key frames, a spline outlining the object within the key frame. As used herein, the term "spline" may refer to any curve that may outline a visual element. For example, the term "spline" may refer to a curve that is defined by one or more piecewise and/or polynomial functions. In some examples, the term "spline" as used herein may refer to a basis spline (or "B-spline"). As noted above, in some examples a spline may be defined by a piecewise polynomial function. In these examples, the pieces of polynomial may meet at their extreme points, resulting in a continuous polynomial. Herein, the meeting points of the pieces of polynomial may be referred to as "knots."

As discussed above, systems described herein may generate a spline outlining the object for each key frame. Thus, for example, having identifying the object in each key frame of the video (e.g., defined using a pixel map), the systems described herein may, using the pixel map of the object as input for each key frame, generate a spline that outlines the pixel map (and, therefore, the object). The systems described herein may generate a spline from a pixel map in any suitable manner. For example, these systems may first generate a piecewise linear curve that outlines the pixel map and then apply an iterative end-point fit algorithm to the piecewise linear curve to generate the spline. In some examples, the systems described herein may apply the Douglas-Peucker algorithm to the piecewise linear curve to generate the spline.

In various embodiments, the systems described herein may generate a spline that outlines the outer bounds of the object. Additionally or alternatively, in some examples such a spline may contain pixels that are not a part of the object (e.g., because projection of the object onto the frame has a hole, such as may be seen in a donut or in the space between a person's arm and torso when the person's hand is on the person's hip). Accordingly, in some embodiments the systems described herein may generate one or more additional splines defining interior bounds of the object. Thus, for example, if the object were a donut, the systems described herein may generate a spline outlining the outer bounds of the donut and another spline outlining the inner bounds of the donut (i.e., the donut hole). In this example, together, the two splines may define the bounds of the object.

As mentioned earlier, in some examples the systems described herein may separately track parts of the object. Accordingly, in some examples, these systems may generate separate splines for each tracked part of the object (e.g., spline for each part that outlines the part. As may be appreciated, because the parts of the object may exhibit movements that are at least partly independent of each other, each part of the object may have its own set of key frames. Accordingly, in some examples, the systems described herein may generate individual splines for distinct parts of the object for the key frames of the respective parts.

Method 200, at step 240, next includes receiving input to adjust, for a selected key frame within the subset of key frames, a corresponding spline. The systems described herein may receive the input in any suitable context. For example, a user (e.g., a visual effects artist) may visually inspect a spline of the object at a key frame and determine that the spline is inaccurate. In some examples, the spline itself may present as an interface element to the user. For example, pieces of polynomial, knots, and/or control points of the spline may be displayed by an interface overlaying the frame, and one or more of these elements of the spline may also be interactive elements (e.g., allowing a user to click and drag one or more of the elements to modify the spline). Thus, for example, the user may click and drag a knot of the spline, and the systems described herein may update the two pieces of polynomial connected to the knot to reflect the new position of the knot. In another example, the user may move a control point of the spline to alter the curve of the spline.

As mentioned above, in some examples the systems described herein may separately track and generate splines for parts of the object. In these examples, the systems described herein may receive input to modify a spline for a part of the object at a key frame for the part. Thus, for example, the a user may provide input to move a knot and/or a control point of the spline for the part of the object.

Method 200, at step 250, next includes interpolating the adjusted spline with a spline in a sequentially proximate key frame to define the object in frames between the selected key frame and the sequentially proximate key frame. For example, the sequentially proximate key frame may be the key frame for the object that is directly previous to the selected key frame. In another example, the sequentially proximate key frame may be the key frame for the object that directly follows the selected key frame. As may be appreciated, modifying the spline in the selected key frame may impact both the interpolation of the spline in frames preceding the selected key frame and in frames following the selected key frame. Accordingly, in various examples, the systems described herein may both (1) interpolate the adjusted spline with the spline in a previous key frame to define the object in frames between the selected key frame and the previous key frame and (2) interpolate the adjusted spline with the spline in a subsequent key frame to define the object in frames between the selected key frame and the subsequent key frame.

The systems described herein may interpolate two splines in any suitable manner. In some examples, systems described herein may apply incremental changes to a source spline (and/or to one or more properties of the source spline) in the direction of a target spline (and/or to one or more properties of the target spline). In some examples, these systems may make these incremental changes in proportion to the number of intervening non-key frames between the source and target splines. For example, if there are four intervening non-key frames between two key frames with a source and target spline, respectively, there may be five transitions from the source spline to the target spline. Thus, systems described herein may make changes from the source spline in the direction of the target spline in 20% increments.

As mentioned above, the systems described herein may interpolate two splines by interpolating one or more properties of the two splines. For example, systems described herein may interpolate each of the corresponding curve pieces of the two splines, the positions of the corresponding knots of the two splines, and/or the relative positions of the corresponding control points of the two splines. In some examples, the systems described herein may identify a position of each of the splines as a whole (e.g., a centroid of the figure formed by each spline), interpolate the positions of the splines as a whole, and then interpolate other properties of the splines relative to the interpolated positions of the splines. For example, the systems described herein may interpolate the positions of each corresponding pair of knots of the two splines relative to the interpolation of the centroids of the two splines.

In one example, the systems described herein may interpolate two splines by identifying a distance metric defining a difference between the two splines and then generating an intermediate spline based on minimizing the distance of the intermediate spline and the two splines being interpolated according to the distance metric. In some examples, the systems described herein may weight the minimization of the distance in proportion to the interpolation progress. For example, if there are four intervening non-key frames between two key frames with splines to be interpolated, the spline for the first non-key frame from the source frame may be generated by weighting the minimization of distance of the intermediate spline from the source spline by 80% and the minimization of distance of the intermediate spline from the target spline by 20%. For the second, third, and fourth non-key frames from the source frame, the respective weightings may be 60%/40%, 40%/60%, and 20%/80%. The systems described herein may use any suitable distance metric to measure distance between two splines. For example, these systems may use a Hausdorff distance.

Once the systems described herein have interpolated two splines of the object from two consecutive keyframes to generate a sequence of intermediate splines, each intermediate spline in the sequence may be understood to define the object in the corresponding intermediate non-key frame. Thus, the object may be accurately and efficiently defined in each frame of the video without requiring a user to make adjustments to the definition of the object in any frame except for the key frames of the object.

As discussed earlier, in some examples the systems described herein may separately track and define parts of the object with separate splines. Furthermore, these separate parts may each have a separate set of key frames. Accordingly, these systems may interpolate two splines of a part of the object between two key frames of the part using any suitable method, including any of the approaches described above for interpolating two splines.

As may be appreciated, in some examples the systems described herein may iterate steps 240 and 250 of method 200 multiple times as a user makes adjustments to various splines in various key frames of the object (or to key frames of parts of the object) and the systems described herein interpolate the adjusted key frames to generate new intermediate splines in non-key frames. While, in some examples, the systems described herein may reinterpolate non-key frames each time the user adjusts a spline in a key frame, in some examples, the user may make multiple adjustments across multiple key frames before the systems described herein perform an interpolation.

Furthermore, as described earlier, in some examples the user may adjust splines for parts of the object separately from the object as a whole. Thus, systems described herein may have separate accurate splines for parts of the object in a number of frames of the video. In some examples, the systems described herein may preserve the accurate splines for the individual parts (e.g., to facilitate video effects to be applied to the parts separately). Additionally or alternatively, the systems described herein may merge the splines of separate parts to generate a spline for the object as a whole based on the accurate splines of the parts.

Once the user has adjusted splines of the object in various key frames as needed, the object may be accurately defined by splines in each frame of the video. In some examples, the systems and methods described herein may make use of the splines defining the object in any of a variety of ways. In some examples, these systems may receive input (e.g., from a visual effects artist) to apply an effect to the object in one or more frames of the video. Additionally or alternatively, these systems may receive input to apply an effect to the frame excluding the object. In some examples, the systems described herein may export the splines for use in another application (e.g., a video production application).

Figure 3:
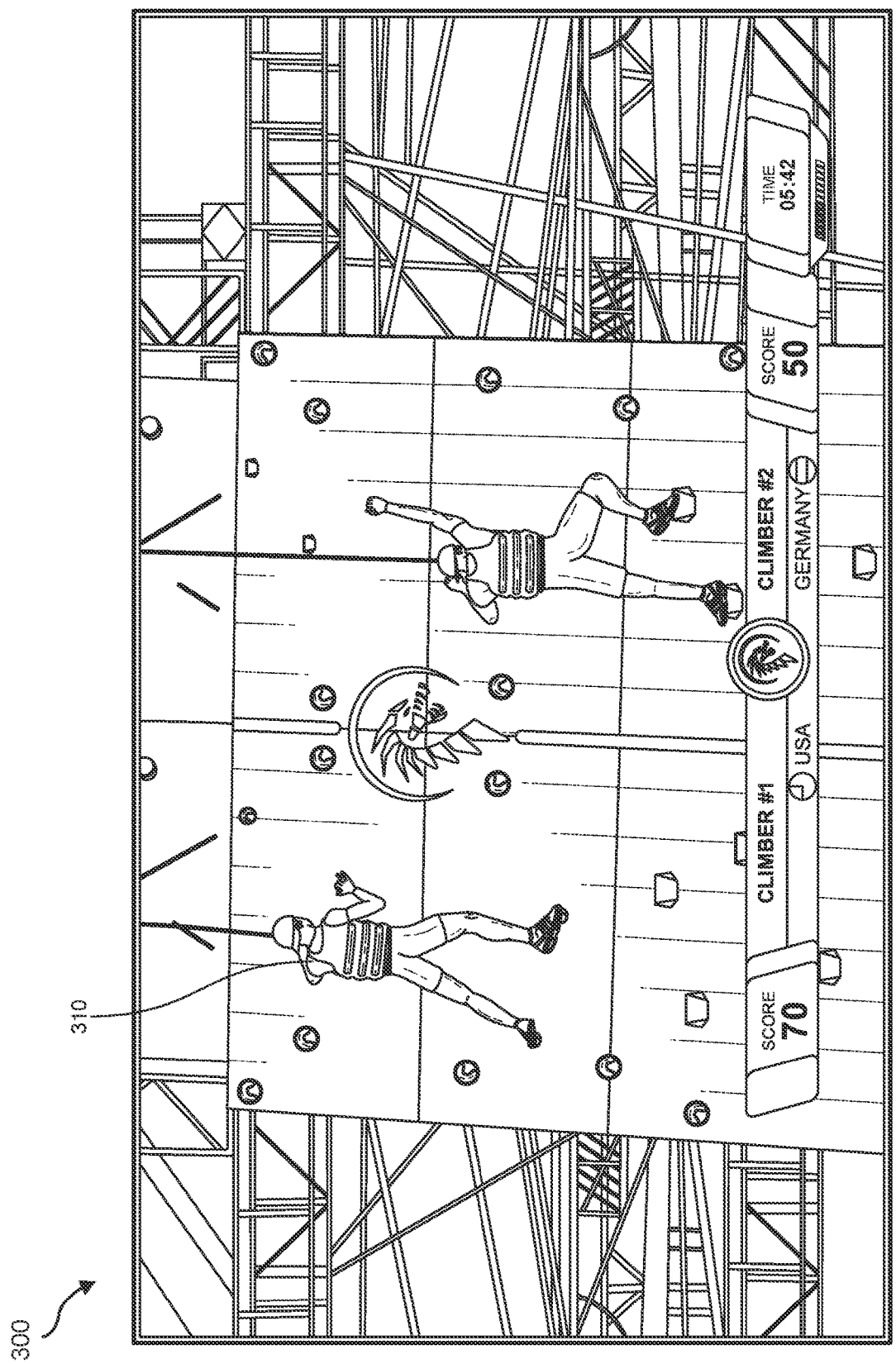
FIG. 3 is an illustration of an exemplary frame of a video within which an object may be tracked.

FIG. 3 is an illustration of a frame of a video within which an object may be tracked. In this example, the video illustrates two climbers climbing a rock wall with an informational overlay near the bottom of the video. As shown in FIG. 3, a frame 300 depicts a person 310. A video effects artist may have a video production task to apply an effect that depends on defining person 310 apart from the environment. For example, the effect may highlight person 310, remove person 310, replace the environment surrounding person 310, etc. Accordingly, systems and methods described herein may enable a user to define person 310 across the frames of the video (e.g., in preparation for applying the effect). In some examples, frame 300 may be a part of video 150 of FIG. 1 and person 310 may be object 151 of FIG. 1.

Figure 4:
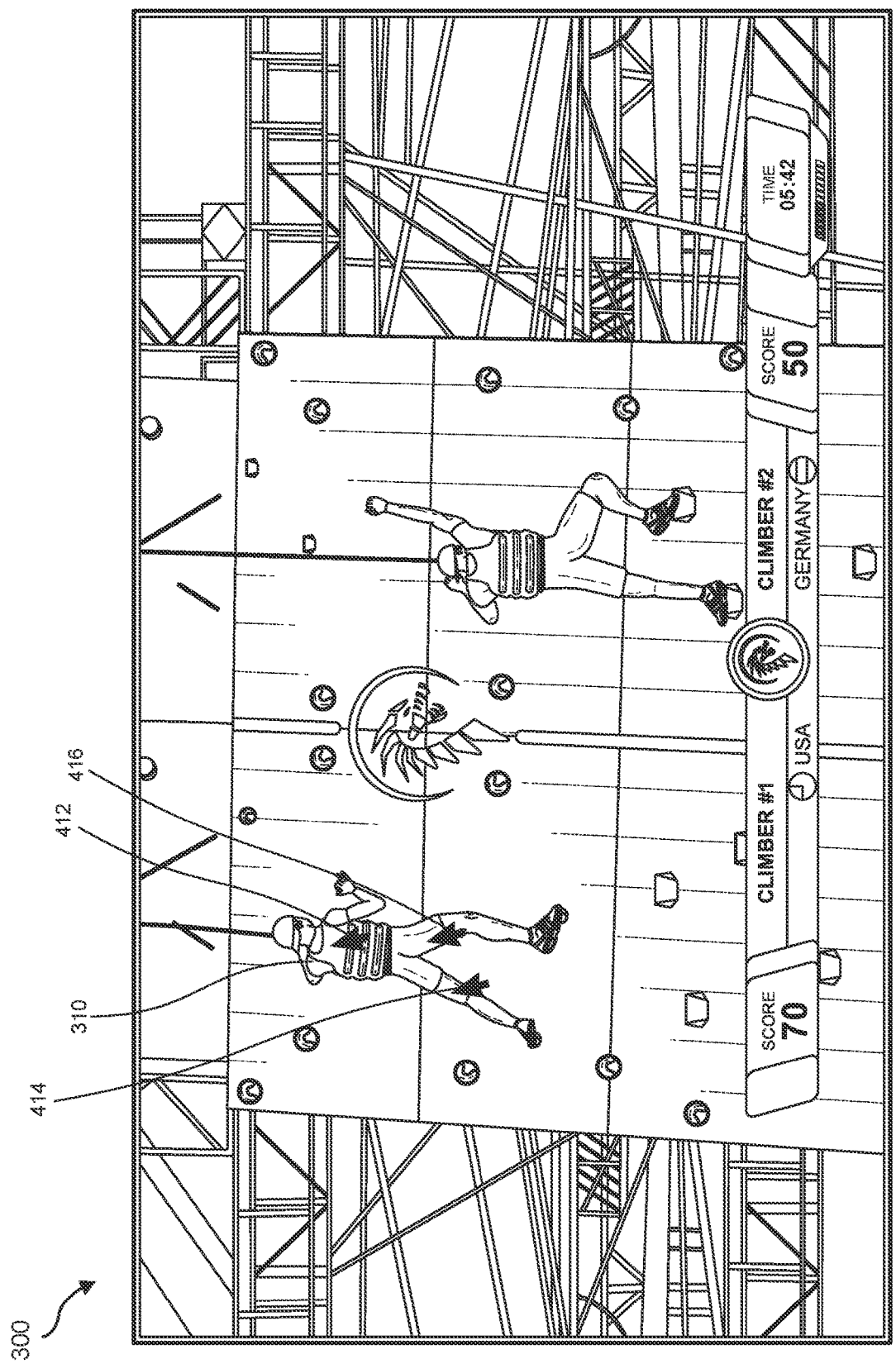
FIG. 4 is an illustration of an exemplary selection of an object within a video frame.

FIG. 4 is an illustration of an exemplary selection of an object within a video frame. For example, frame 300 may be presented to a user. The user may select different points of person 310 in frame 300 (e.g., by clicking on the points with a mouse). As shown in FIG. 4, by way of example, a user may click on person 310 in frame 300 at points 412, 414, and 416. In other examples, a user may select points 412, 414, and 416 (and, e.g., various other points within person 310) by scribbling inside person 310.

Figure 5:
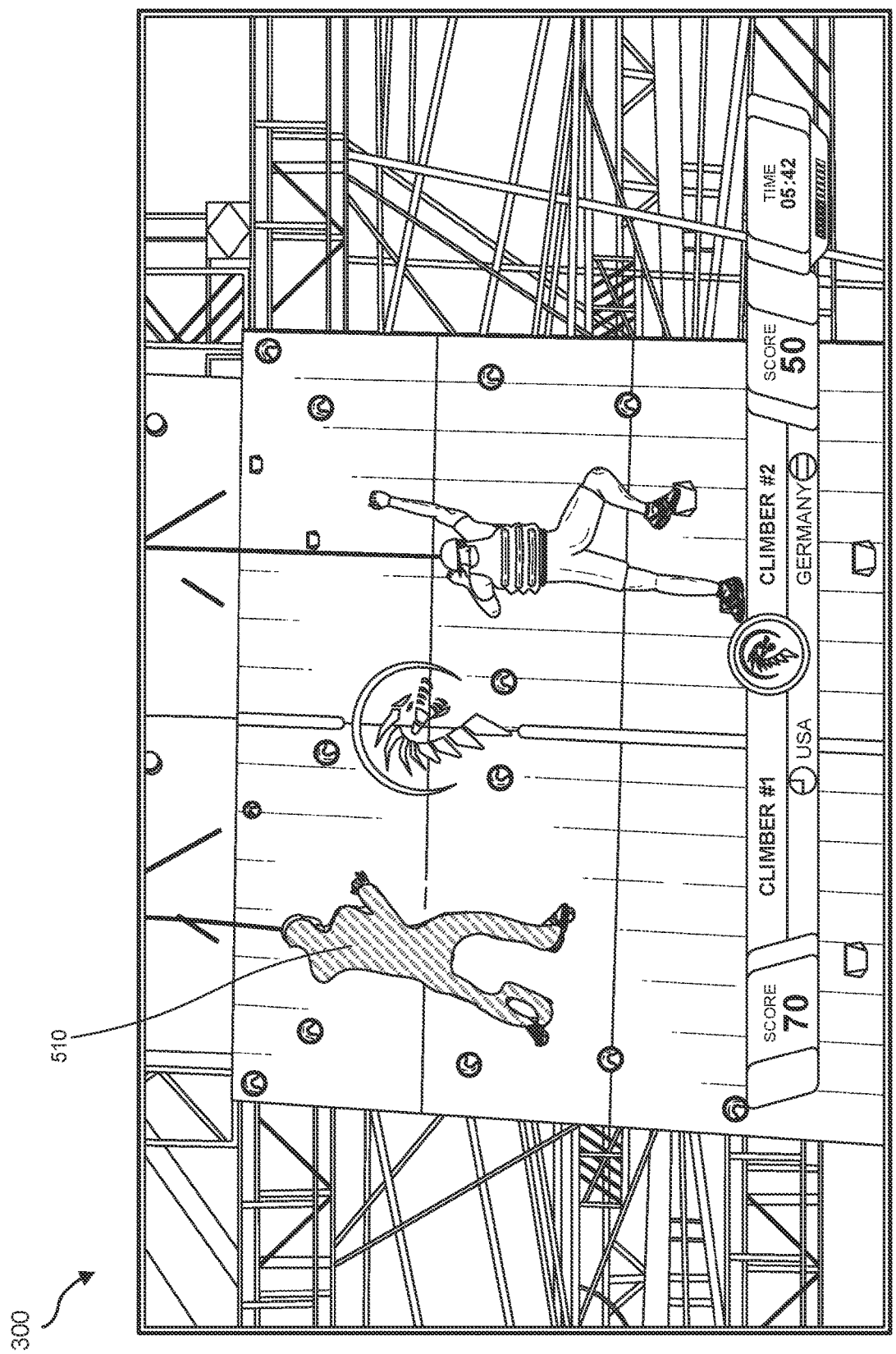
FIG. 5 is an illustration of an exemplary pixel mask generated for an object.

FIG. 5 is an illustration of an exemplary pixel mask generated for an object. As shown in FIG. 5, a pixel mask 510 roughly covers person 310 in frame 300. However, pixel mask 510 may not be fully accurate. For example, portions of person 310 may not be covered by pixel mask 510 (e.g., fingers, left foot, etc.). In addition, pixel mask 510 may cover portions of frame 300 outside of person 310. In some examples, systems described herein and/or systems providing input to the systems described herein may generate pixel mask 510 for person 310 (e.g., based on a machine learning model in conjunction with the inputs selecting person 310 shown in FIG. 4). In addition, these systems may propagate the identification to frames of the video that precede and/or follow frame 300. In this manner, a pixel mask may be generated for person 310 in each frame of the video based on the inputs illustrated in FIG. 4.

Figure 6:
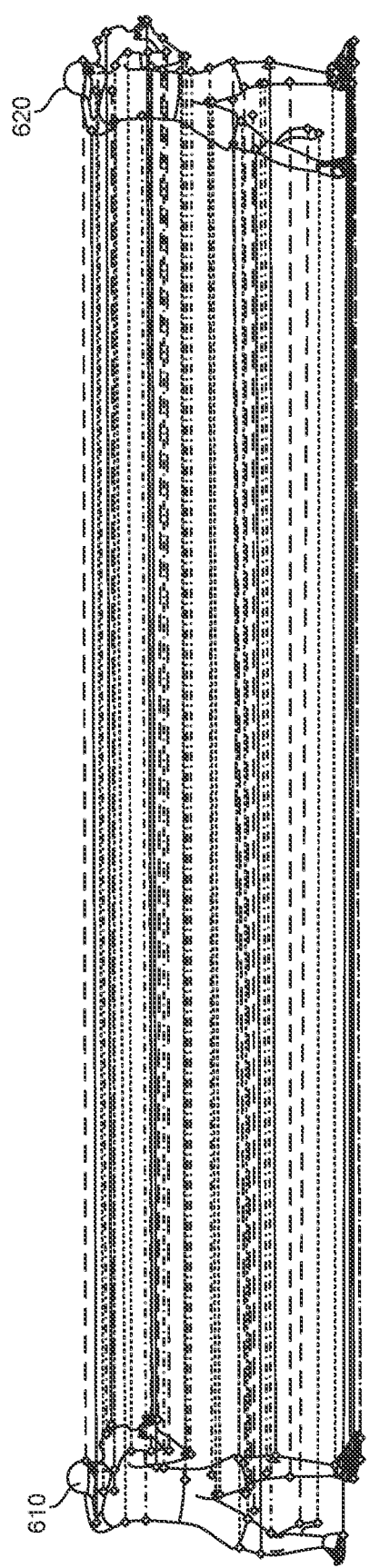
FIG. 6 is an illustration of an exemplary method for tracking movement of an object across video frames.

FIG. 6 is an illustration of an exemplary method for tracking movement of an object across video frames. As shown in FIG. 6, systems described herein may compare a position 610 of an object (e.g., person 310) with a position 620. In particular, these systems may match specific points of person 310 in position 610 with corresponding points of person 310 in position 620. In some examples, positions 610 and 620 may represent positions of person 310 in consecutive frames of the video.

Systems described herein may measure the movement of person 310 between positions 610 and 620 in any of a variety of ways. For example, these systems may perform feature tracking of the matched points within the object. In one example, a trained neural network may assign points of person 310 in position 610 in one frame to points of person 310 in position 620 in the next frame. The systems described herein may then calculate an overall movement of person 310 from position 610 to position 620 based on an aggregation of the movement of the each of the points from one frame to the next. The movement of the points may be aggregated into a single movement metric using any suitable aggregation function, including, e.g., a sum of the movement of the points, an average movement of the points, etc.

Figure 7:
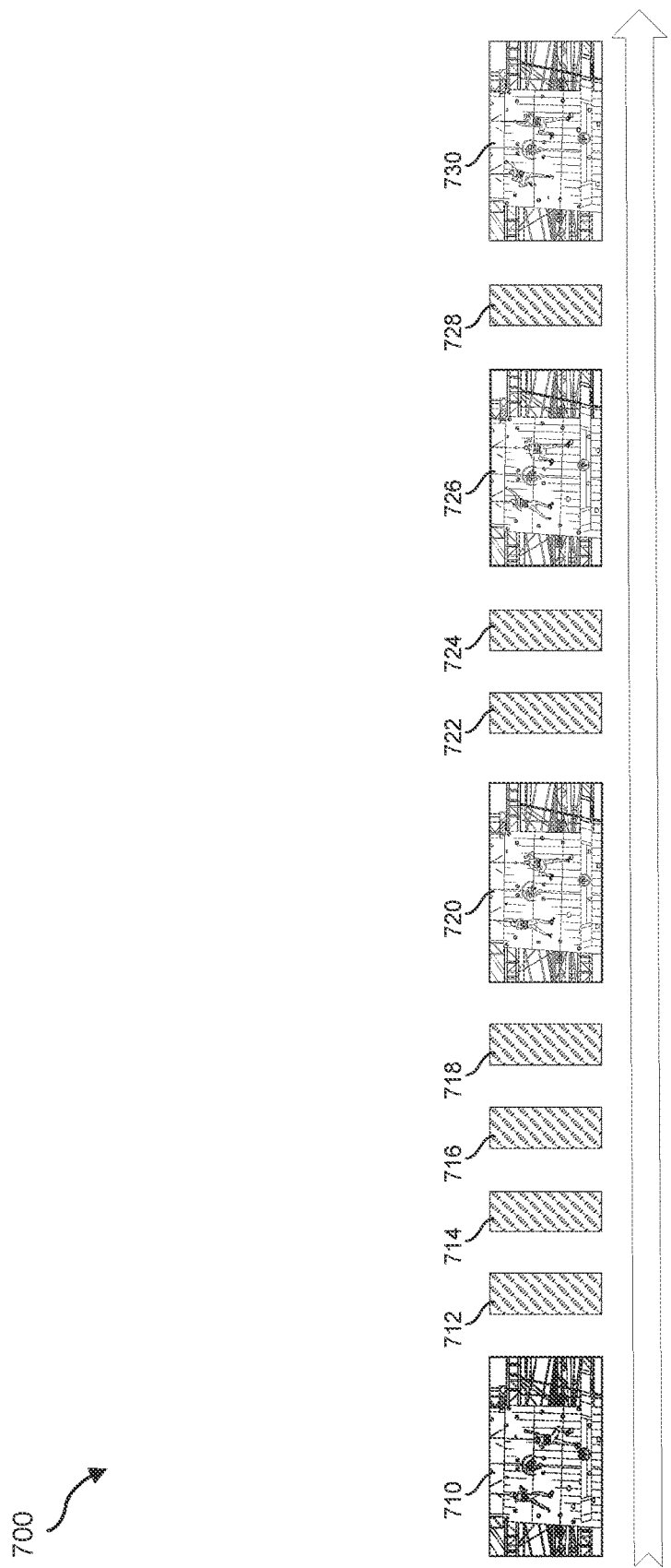
FIG. 7 is an illustration of an exemplary subset of key frames within a set of frames.

FIG. 7 is an illustration of an exemplary subset of key frames within a set of frames. As shown in FIG. 7, a video 700 may include frames 710, 712, 714, 716, 718, 720, 722, 724, 726, 728, and 730, which may collectively portray person 310 climbing a rock wall. However, person 310 may make only minor movements in several of the frames, and may make more substantial movements in frames 710, 720, 726, and 730. Accordingly, systems described herein may designate frames 710, 720, 726, and 730 as key frames for person 310. These systems may determine that frames 710, 720, 726, and 730 show substantial movement for person 310 in any suitable manner. For example, these systems may use the techniques described in relation to FIG. 6 to measure the movement of person 310 from frame to frame.

Figure 8:
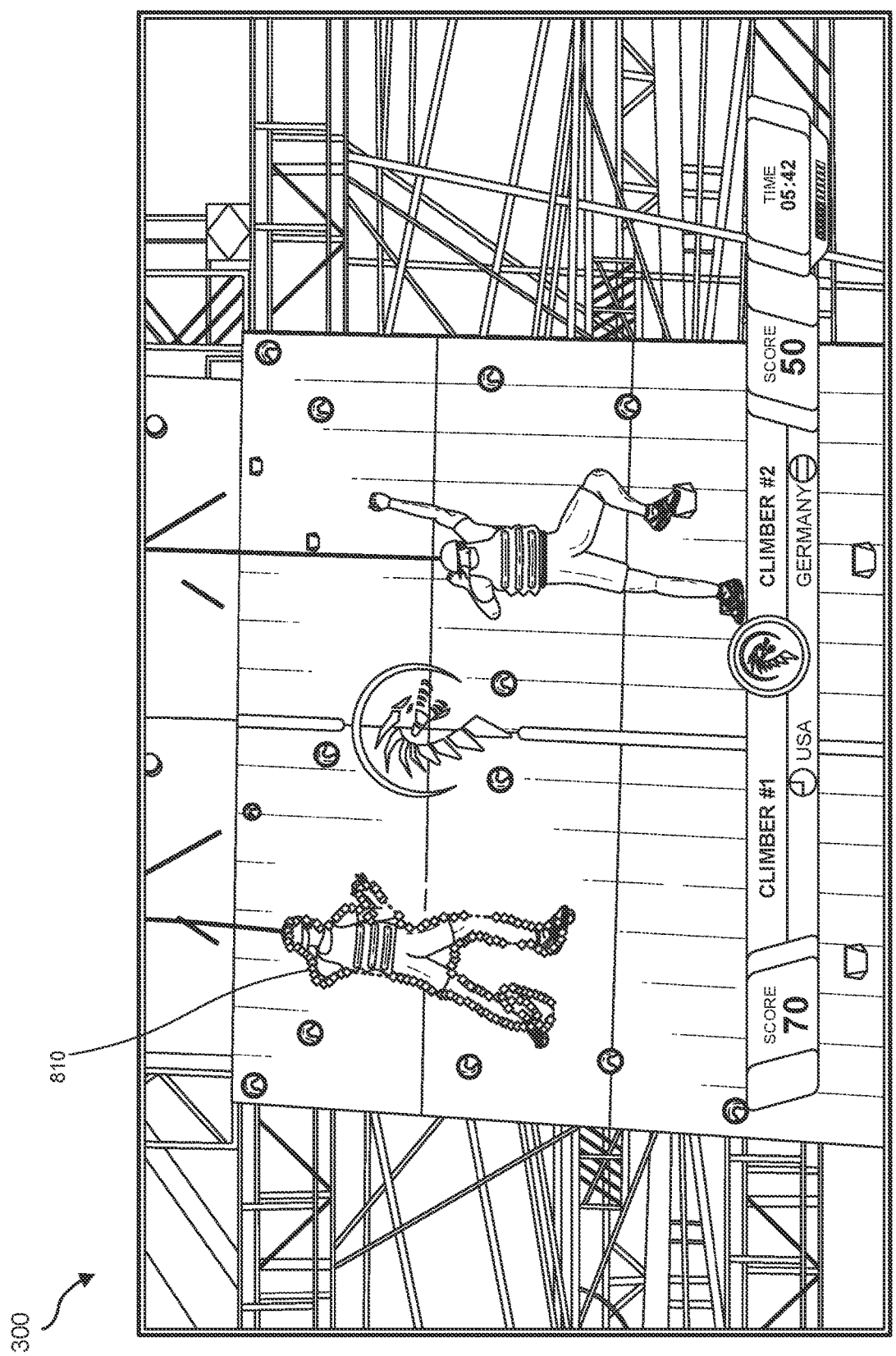
FIG. 8 is an illustration of an exemplary spline generated for an object.

FIG. 8 is an illustration of an exemplary spline generated for an object. As shown in FIG. 8, systems described herein may generate a spline 810 for person 310 in frame 300. These systems may generate spline 810 based on pixel mask 510 shown in FIG. 5. Accordingly, spline 810 may have the same inaccuracies in defining person 310 in frame 300 as does pixel mask 510. The systems described herein may generate spline 810 from pixel mask 510 in any suitable manner including, e.g., generating a piecewise linear curve that outlines pixel map 510 and then applying an iterative end-point fit algorithm to the piecewise linear curve to generate spline 810.

Figure 9:
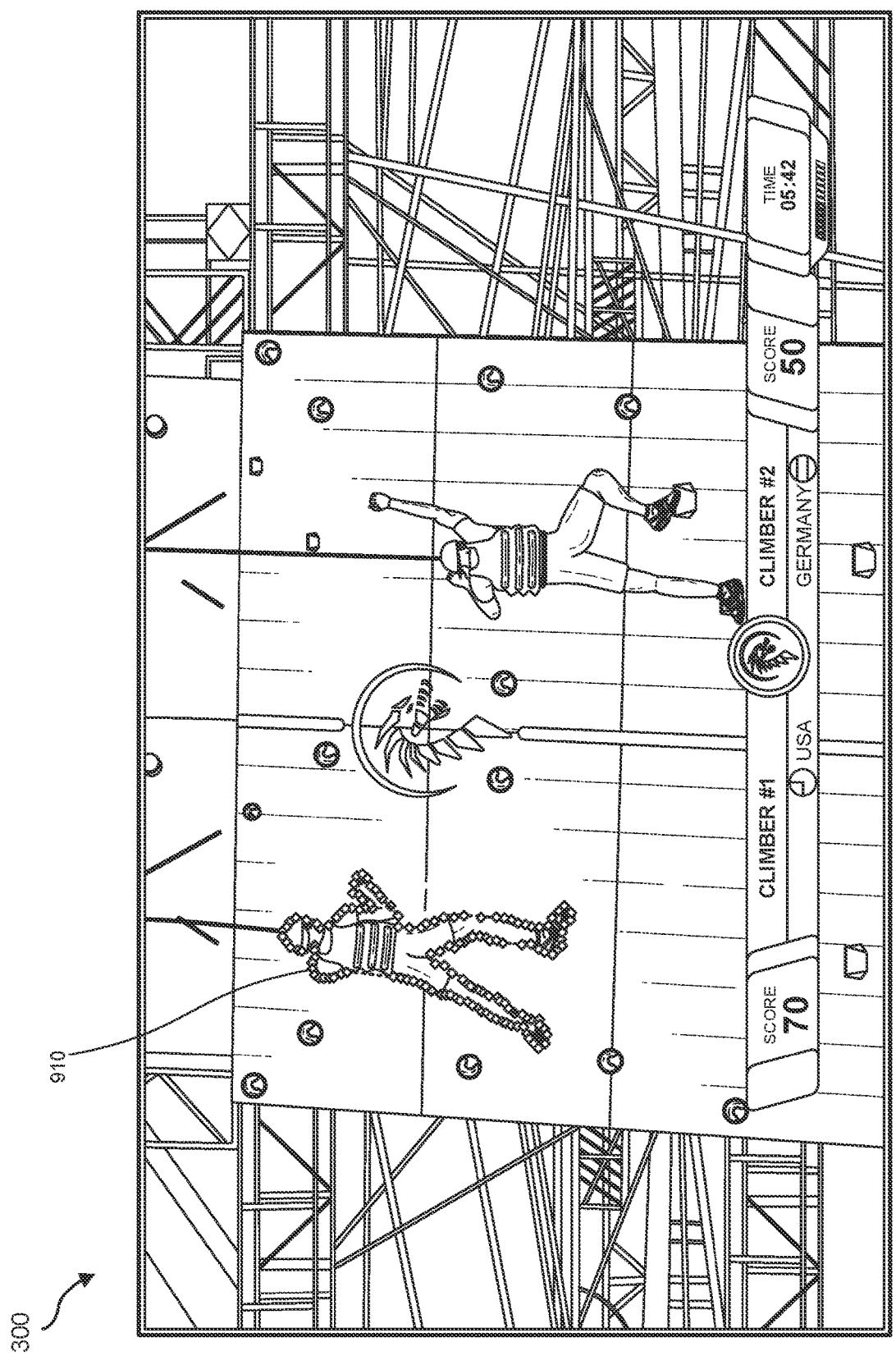
FIG. 9 is an illustration of an exemplary adjustment to the spline of FIG. 9.

FIG. 9 is an illustration of an exemplary adjustment to the spline of FIG. 8. As shown in FIG. 9, a spline 910 may accurately outline person 310 in frame 300. In comparison to spline 810 of FIG. 8 and pixel mask 510 of FIG. 5, spline 910 may capture all parts of person 310 while excluding all other parts of frame 300. In some examples, systems described herein may provide frame 300 and spline 810 as shown in FIG. 8 as part of an editable interface to a user (e.g., a visual effects artist). The user may adjust spline 810 in the interface to produce spline 910 by, e.g., manipulating the spline (e.g., dragging knots of the spline into position to accurately outline person 310).

Figure 10:
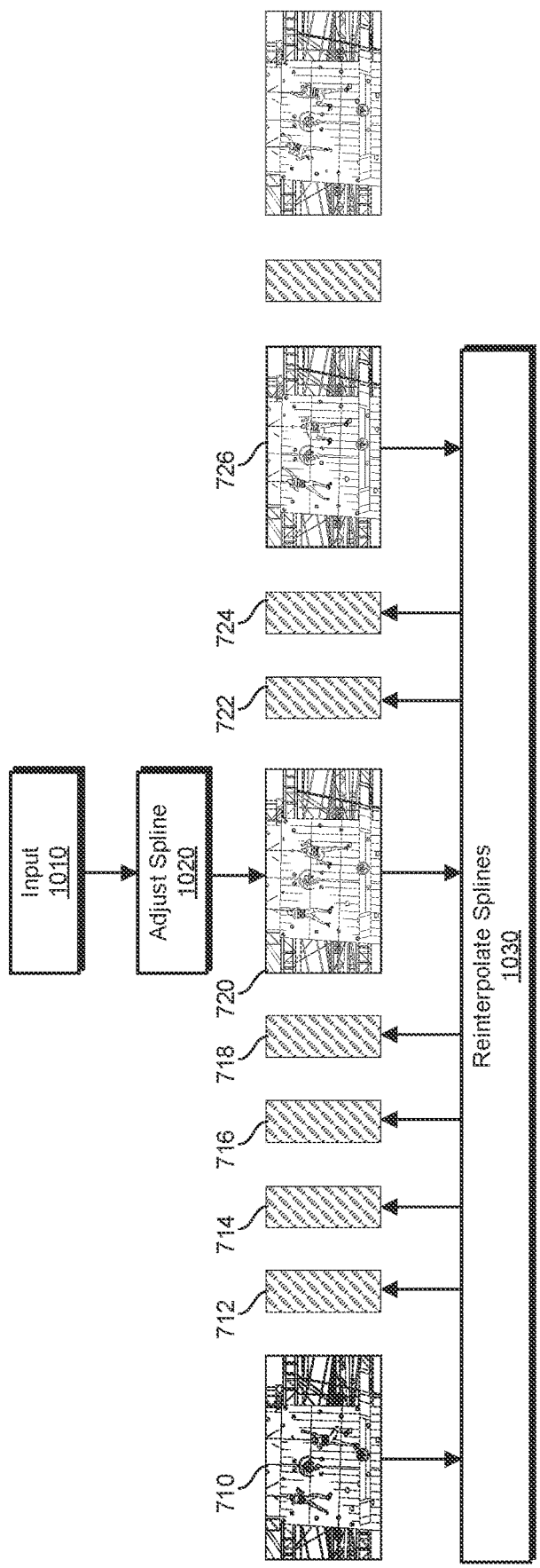
FIG. 10 is a diagram of an exemplary reinterpolation of splines following the adjustment of a spline in a key frame.

FIG. 10 is a diagram of an exemplary reinterpolation of splines following the adjustment of a spline in a key frame. As shown in FIG. 10, systems described herein may receive input 1010 from a user (e.g., interacting with an editable spline) to adjust a spline of person 310 in key frame 720. Accordingly, systems described herein may perform an adjust spline operation at 1020 in accordance with input 1010. Once the spline of frame 720 is adjusted, the systems described herein may perform a reinterpolate splines operation at 1030. For example, because the spline at key frame 720 was adjusted, these systems may reinterpolate the splines between key frame 710 and key frame 720. Accordingly, systems described herein may update the splines of person 310 in non-key frames 712, 714, 716, and 718 by interpolating the spline of person 310 for key frame 710 with the adjusted spline of person 310 for key frame 720. Similarly, because the spline at key frame 720 was adjusted, the systems described herein may reinterpolate the splines between key frame 720 and key frame 726. Accordingly, these systems may update the splines of person 310 in non-key frames 722 and 724 by interpolating the spline of person 310 for key frame 720 with the adjusted spline of person 310 for key frame 726.

Figure 11:
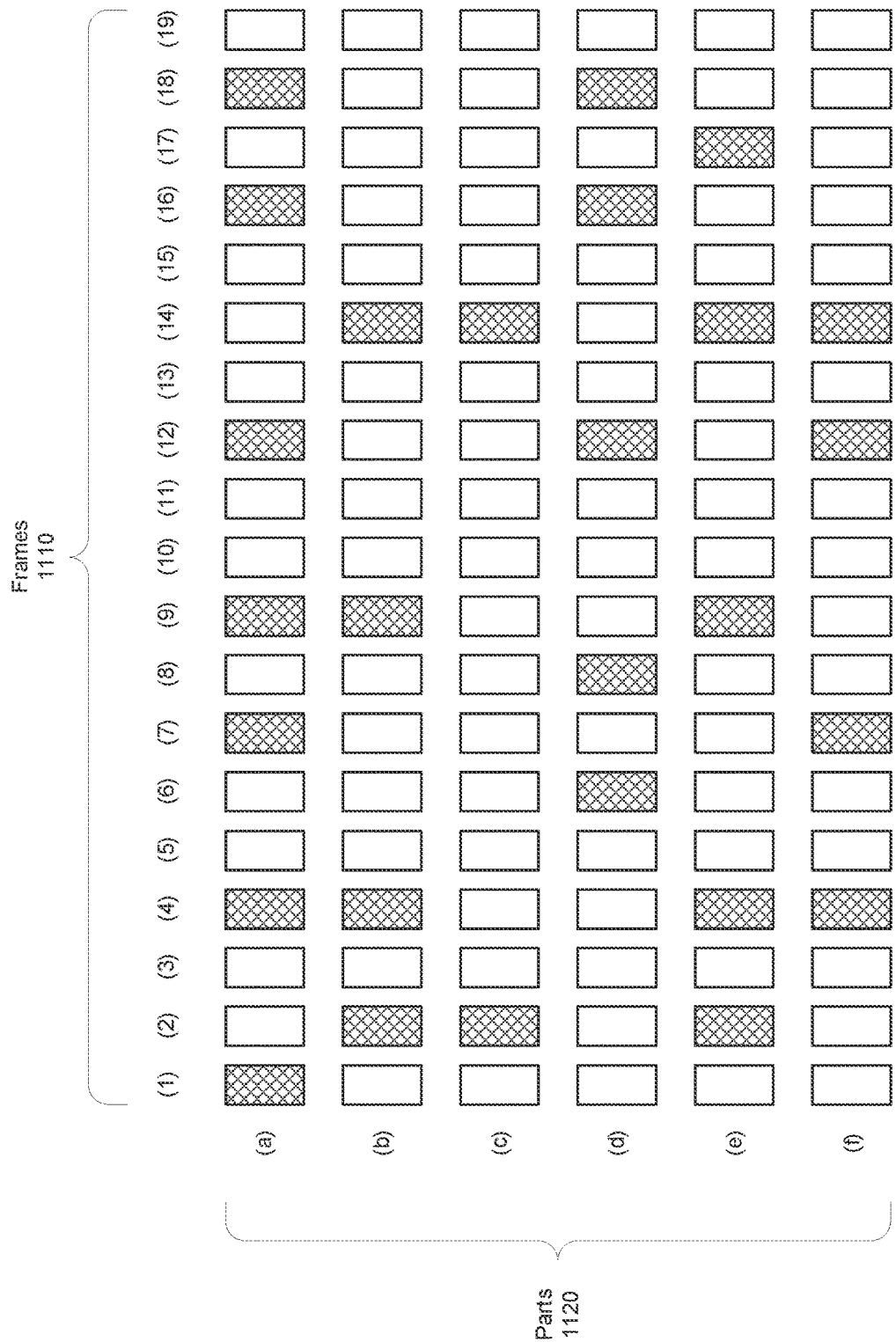
FIG. 11 is a diagram of exemplary key frames for parts of a decomposed object.

FIG. 11 is a diagram of exemplary key frames for parts of a decomposed object. As shown in FIG. 11, systems described herein may identify an object as having parts 1120(a), 1120(b), 1120(c), 1120(d), 1120(e), and 1120(f). As described earlier, parts of an object may represent portions of the object that tend to move together, but partly independently from other parts of the object (e.g., a hand and a foot of a person may move partly independently from each other). Accordingly, each part of an object may have defined a separate set of key frames. For example, for frames 1110(1)-(19), different parts 1120(a)-(f) may have different key frames. Thus, for example, part 1120(a) may have key frames at frames 1110(1), (4), (7), (9), (12), (16), and (18). Likewise, part 1120(e) may have key frames at frames 1110(2), (4), (9), (14), and (17).

Figure 12:
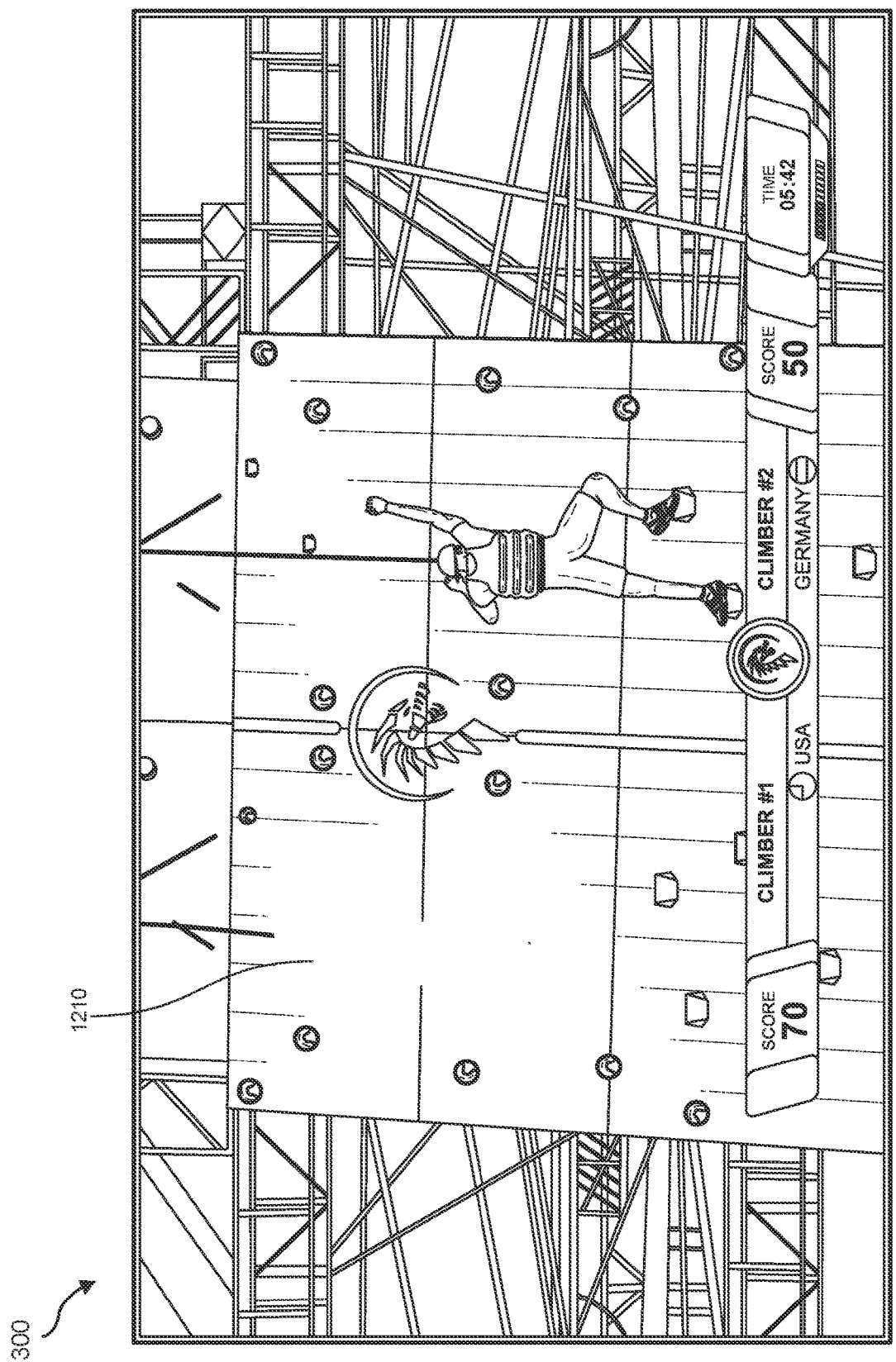
FIG. 12 is an illustration of an exemplary edit to a video based on a spline of an object.

FIG. 12 is an illustration of an exemplary edit to a video based on a spline of an object. As shown in FIG. 12, an edit 1210 applied to frame 300 has removed person 310 from frame 310. Systems were able to precisely apply edit 1210 to person 310 because adjusted spline 810 accurately defined person 310. Similarly, edit 1210 maybe applied to other frames of the video that are accurate due to the splines having been manually adjusted (in the case of key frames) or due to the splines having been generated by interpolation from manually adjusted splines (in the case of non-key frames).

Figure 13:
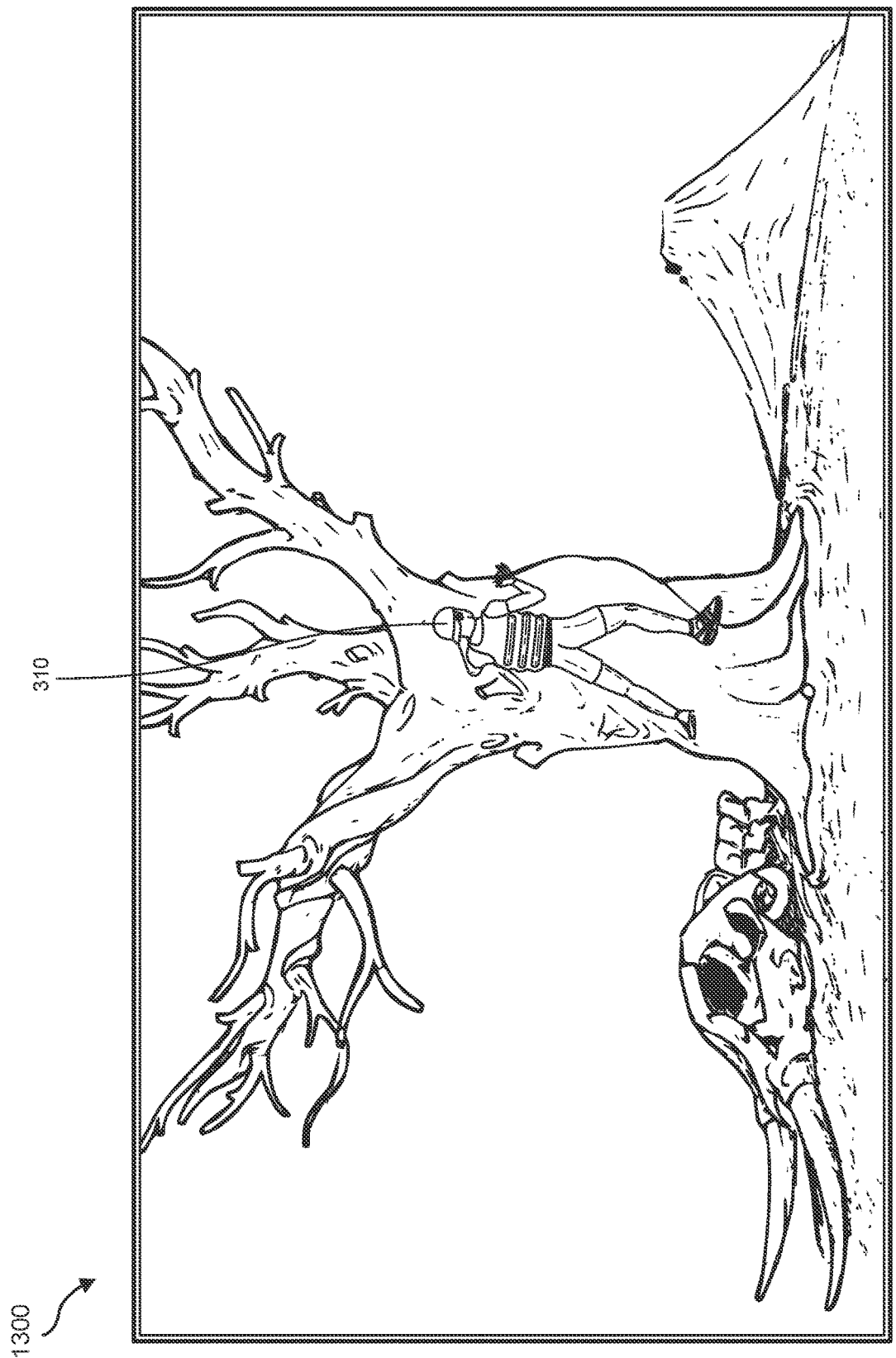
FIG. 13 is an illustration of an exemplary edit to a video based on a spline of an object.

FIG. 13 is an illustration of an exemplary edit to a video based on a spline of an object. As shown in FIG. 13, person 310 may be inserted into a new frame 1300 illustrating a different environment than the climbing wall. Systems were able to precisely extract person 310 from the original video and insert person 310 into frame 1300 because the adjusted and reinterpolated splines of person 310 accurately defined person 310. Similarly, images of person 310 from other frames of the original video may be inserted into other new frames depicting the environment shown in FIG. 13.

The foregoing illustrates various examples and embodiments. Rotoscopy may be understood as the task of selecting objects from shots of movies. During the application of visual effects and post-processing, artists may rotoscope to generate masks before applying visual effects on the plate. One example usage of rotoscopy is to remove the green screen background from a plate.

Systems described herein may assist rotoscopy artists with machine learning. Instead of the artists being required to draw the boundaries of a spline precisely, systems described herein may use a scribble-to-mask interaction to generate an initial pixel mask for an initial frame. Furthermore, users may be directed to select trimaps. Thus, users may specify the foreground (i.e., an object), the background, and an intermediate region. The output of the algorithm may produce an alpha mask such that $C_i = \alpha_i F_i + (1-\alpha_i) B_i$, where the value of $\alpha$ is the transparency of the foreground value. In this manner, users may directly select objects with few clicks instead of painstakingly drawing splines around an object.

Once the user selects the object, systems described herein may track objects as they move across frames using an interactive video object segmentation method. This may include generating masks from interactions and propagating the masks across frames using semi-supervised video object segmentation methods.

The systems described herein may apply a Douglas-Peucker algorithm to generate splines from the pixel mask of each frame. In order to maintain consistency, the systems described herein may use feature tracking to make sure that the points of selected splines are consistently maintained over time. Then, the systems described herein may export the spline points into a data structure that can be exchanged among visual effects tools.

Not all frames in a motion picture have the same level of movements. Furthermore, not all parts of the objects necessarily move at the same rate. Depending on the downstream video editing task (in-painting, de-aging, etc.), the fidelity of the mask may have different parameters. To help track objects when they are moving rapidly and also to divide the object into separate parts, systems described herein may create splines at frames determined to be significant based on movements being higher (i.e., key frames).

To this end, systems described herein may employ feature tracking of pixels within the object. With this feature tracking, systems described herein may estimate relative motion between two consecutive frames of an object. When higher movements are registered, the systems described herein may mark the frame as a key frame. With the same features, these systems may group parts of the object that move together by using unsupervised clustering on the tracked features of interest. In this manner, systems described herein may capture the movements of the same plate with fewer key frames, making editing in downstream tasks for a visual effects artist easier and less time consuming.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   accessing a video portraying an object within a set of frames;
   defining a subset of key frames within the video based on movement of the object across the set of frames by:
   calculating a movement metric describing movement of the object between a sequential pair of frames included in the set of frames;
   determining that the movement metric exceeds a predetermined threshold; and
   in response to determining that the movement metric exceeds the predetermined threshold, adding one of the sequential pair of frames to the subset of key frames;
   generating, for each key frame within the subset of key frames, a spline outlining the object within the key frame;
   receiving input to adjust, for a selected key frame within the subset of key frames, a corresponding spline; and
   interpolating the adjusted spline with a spline in a sequentially proximate key frame to define the object in frames between the selected key frame and the sequentially proximate key frame.

2. The computer-implemented method of claim 1, wherein calculating the movement metric comprises:
   matching a set of local features between the object in a first image of the sequential pair of frames and in the object in a second image of the sequential pair of frames; and
   for each local feature within the set of local features, calculating a difference of position between the local feature in the first image and the local feature in the second image.

3. The computer-implemented method of claim 2, further comprising:
   decomposing the object into a set of parts;
   defining a part-based subset of key frames within the video based on movement of a part from the set of parts across the set of frames;
   generating, for each part-based key frame within the subset of part-based key frames, a spline of the part within the part-based key frame;
   receiving input to adjust, for a selected part-based key frame within the subset of part-based key frames, a corresponding part-based spline; and
   interpolating the adjusted part-based spline with a part-based spline in a sequentially proximate part-based key frame to define the part in frames between the selected part-based key frame and the sequentially proximate part-based key frame.

4. The computer-implemented method of claim 3, wherein decomposing the object into the set of parts comprises clustering local features from within the set of local features based on movement of the local features.

5. The computer-implemented method of claim 3, further comprising recomposing the object from the set of parts based at least in part on the adjusted part-based spline of the part.

6. The computer-implemented method of claim 1, wherein generating, for each key frame within the subset of key frames, the spline outlining the object within the key frame comprises:
   identifying, for each key frame within the subset of key frames, a pixel mask of the object; and
   generating the spline to outline the pixel mask.

7. The computer-implemented method of claim 6, wherein identifying, for each key frame within the subset of key frames, the pixel mask of the object comprises:
- identifying the object in an initial frame of the set of frames; and
- tracking the object from the initial frame through the set of frames.

8. The computer-implemented method of claim 7, wherein identifying the object in the initial frame comprises receiving user input indicating one or more points within the initial frame included within the object.

9. The computer-implemented method of claim 1, further comprising modifying the object within the video based at least in part on the adjusted spline of the object.

10. A system comprising:
- at least one physical processor; and
- physical memory comprising computer-executable instructions that, when executed by the physical processor, cause the physical processor to:
  - access a video portraying an object within a set of frames;
  - define a subset of key frames within the video based on movement of the object across the set of frames by:
    - calculating a movement metric describing movement of the object between a sequential pair of frames included in the set of frames;
    - determining that the movement metric exceeds a predetermined threshold; and
    - in response to determining that the movement metric exceeds the predetermined threshold, adding one of the sequential pair of frames to the subset of key frames;
  - generate, for each key frame within the subset of key frames, a spline outlining the object within the key frame;
  - receive input to adjust, for a selected key frame within the subset of key frames, a corresponding spline; and
  - interpolate the adjusted spline with a spline in a sequentially proximate key frame to define the object in frames between the selected key frame and the sequentially proximate key frame.

11. The system of claim 10, wherein calculating the movement metric comprises:
- matching a set of local features between the object in a first image of the sequential pair of frames and in the object in a second image of the sequential pair of frames; and
- for each local feature within the set of local features, calculating a difference of position between the local feature in the first image and the local feature in the second image.

12. The system of claim 11, the computer-executable instructions further causing the physical processor to:
- decompose the object into a set of parts;
- define a part-based subset of key frames within the video based on movement of a part from the set of parts across the set of frames;
- generate, for each part-based key frame within the subset of part-based key frames, a spline of the part within the part-based key frame;
- receive input to adjust, for a selected part-based key frame within the subset of part-based key frames, a corresponding part-based spline; and
- interpolate the adjusted part-based spline with a part-based spline in a sequentially proximate part-based key frame to define the part in frames between the selected part-based key frame and the sequentially proximate part-based key frame.

13. The system of claim 12, wherein decomposing the object into the set of parts comprises clustering local features from within the set of local features based on movement of the local features.

14. The system of claim 12, the computer-executable instructions further causing the physical processor to recompose the object from the set of parts based at least in part on the adjusted part-based spline of the part.

15. The system of claim 10, wherein generating, for each key frame within the subset of key frames, the spline outlining the object within the key frame comprises:
- identifying, for each key frame within the subset of key frames, a pixel mask of the object; and
- generating the spline to outline the pixel mask.

16. The system of claim 15, wherein identifying, for each key frame within the subset of key frames, the pixel mask of the object comprises:
- identifying the object in an initial frame of the set of frames; and
- tracking the object from the initial frame through the set of frames.

17. The system of claim 16, wherein identifying the object in the initial frame comprises receiving user input indicating one or more points within the initial frame included within the object.

18. A non-transitory computer-readable medium comprising one or more computer-executable instructions that, when executed by at least one processor of a computing device, cause the computing device to:
- access a video portraying an object within a set of frames;
- define a subset of key frames within the video based on movement of the object across the set of frames by:
  - calculating a movement metric describing movement of the object between a sequential pair of frames included in the set of frames;
  - determining that the movement metric exceeds a predetermined threshold; and
  - in response to determining that the movement metric exceeds the predetermined threshold, adding one of the sequential pair of frames to the subset of key frames;
- generate, for each key frame within the subset of key frames, a spline outlining the object within the key frame;
- receive input to adjust, for a selected key frame within the subset of key frames, a corresponding spline; and
- interpolate the adjusted spline with a spline in a sequentially proximate key frame to define the object in frames between the selected key frame and the sequentially proximate key frame.

* * * * *